United States Patent
Pan et al.

(10) Patent No.: US 10,673,808 B2
(45) Date of Patent: Jun. 2, 2020

(54) METHOD AND DEVICE FOR BUS ADDRESSING, AND METHOD AND DEVICE FOR PROVIDING INFORMATION

(71) Applicant: SZ DJI TECHNOLOGY CO., LTD., Shenzhen (CN)

(72) Inventors: Guoxiu Pan, Shenzhen (CN); Xiaofeng Feng, Shenzhen (CN); Renli Shi, Shenzhen (CN); Shaohe Du, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 78 days.

(21) Appl. No.: 15/978,774

(22) Filed: May 14, 2018

(65) Prior Publication Data
US 2018/0262464 A1    Sep. 13, 2018

Related U.S. Application Data

(63) Continuation of application No. PCT/CN2015/094913, filed on Nov. 18, 2015.

(51) Int. Cl.
*H04L 12/40* (2006.01)
*H04L 29/12* (2006.01)

(52) U.S. Cl.
CPC .... *H04L 61/2038* (2013.01); *H04L 12/40013* (2013.01); *H04L 61/6027* (2013.01); *H04L 2012/40215* (2013.01)

(58) Field of Classification Search
CPC ...... H04L 29/12; H04L 12/40; H04L 61/2038
See application file for complete search history.

(56) References Cited

U.S. PATENT DOCUMENTS

| | | | | |
|---|---|---|---|---|
| 7,272,457 B2* | 9/2007 | Glanzer | ................ | G05B 15/02 700/83 |
| 7,411,927 B1* | 8/2008 | Bhalla | ..................... | H04L 67/04 370/331 |
| 8,676,357 B2* | 3/2014 | Boercsoek | ......... | G05B 19/4185 700/78 |
| 9,794,345 B2* | 10/2017 | He | .......................... | H04L 67/12 |
| 2009/0024764 A1* | 1/2009 | Atherton | ........... | H04L 29/12254 709/250 |

(Continued)

FOREIGN PATENT DOCUMENTS

| CN | 1812424 A | 8/2006 |
|---|---|---|
| CN | 102347878 A | 2/2012 |

(Continued)

OTHER PUBLICATIONS

Ying Zhang et al., Wireless Sensor Network System Based on ZigBee for Aircraft Condition Monitoring, Computer Measurement & Control, vol. 18 (11), pp. 2481-2484. 2011.

(Continued)

*Primary Examiner* — Steven G Snyder
*Assistant Examiner* — Christopher Daley
(74) *Attorney, Agent, or Firm* — Anova Law Group, PLLC

(57) ABSTRACT

A method for bus addressing includes a controller receiving handshaking information from a component of a control system, allocating a communication address to the component through a field bus, and establishing a correlation between a physical address of the component and the communication address.

16 Claims, 7 Drawing Sheets

---

A controller receives handshaking information from a component of a control system — 201

The controller allocates a CANID to the component through a field bus and establishes a correlation between a physical address and the CANID of the component, the CANID being a communication address of the component in a CAN communication bus — 202

(56) References Cited

U.S. PATENT DOCUMENTS

| | | | | |
|---|---|---|---|---|
| 2010/0121999 | A1* | 5/2010 | Isenmann | H04L 12/40006 |
| | | | | 710/105 |
| 2012/0320927 | A1* | 12/2012 | Katou | H04L 12/66 |
| | | | | 370/401 |
| 2013/0026979 | A1* | 1/2013 | Endo | H02J 7/0013 |
| | | | | 320/107 |
| 2016/0077509 | A1* | 3/2016 | Graf | G05B 19/056 |
| | | | | 700/86 |
| 2016/0185568 | A1* | 6/2016 | Kusserow | B66B 1/3446 |
| | | | | 340/3.31 |
| 2016/0290963 | A1* | 10/2016 | Silvo | B66C 15/06 |
| 2018/0227147 | A1* | 8/2018 | Kataoka | H04L 12/46 |

FOREIGN PATENT DOCUMENTS

| | | |
|---|---|---|
| CN | 202486939 U | 10/2012 |
| CN | 103309308 A | 9/2013 |
| CN | 203275977 U | 11/2013 |
| CN | 103950546 A | 7/2014 |
| CN | 104272204 A | 1/2015 |
| CN | 104662881 A | 5/2015 |
| CN | 105047022 A | 11/2015 |
| CN | 105049551 A | 11/2015 |

OTHER PUBLICATIONS

The World Intellectual Property Organization (WIPO) International Search Report for PCT/CN2015/094913 dated Aug. 15, 2016 5 Pages (including translation).

* cited by examiner

METHOD AND DEVICE FOR BUS ADDRESSING, AND METHOD AND DEVICE FOR PROVIDING INFORMATION

CROSS-REFERENCE TO RELATED APPLICATION

This application is a continuation of International Application No. PCT/CN2015/094913, filed on Nov. 18, 2015, the entire contents of which are incorporated herein by reference.

TECHNICAL FIELD

The disclosure relates to communication technology, more particularly to a method and a device for bus addressing and a method and a device for providing information.

BACKGROUND OF THE DISCLOSURE

High speed serial bus is a standard computer peripheral bus having advantages such as hot plugging, high performance and low system cost. High speed serial bus is widely used in control systems of automatic control, aviation, aerospace, navigation and unmanned aerial vehicle.

Continuous development of technology demands a continuous update of the control systems to satisfy new applications. However, an expansion of the control system employing high speed serial bus is limited as the high speed serial bus is not addressable.

SUMMARY OF THE DISCLOSURE

In view of problems in the conventional technologies, a first aspect of the disclosure provides a technical solution in which an addressing of components of a control system is effected through a field bus. Each component of the control system can have a unique communication address, ensuring an efficiency and a quality in exchanging information between the components and between the components and a controller. The control system can be expanded by the controller allocating communication addresses to components.

The disclosure also provides a device for effecting the technical solution of the first aspect and a method and device for providing information. An operational status of each component of the control system can be provided to the user to improve user's operational experience.

The disclosure provides the following technical solutions.

A first aspect of the disclosure provides a method for bus addressing. The method can comprise a controller receiving handshaking information from a component of a control system; and the controller allocating a communication address to the component through a field bus, and establishing a correlation between a physical address and the communication address of the component.

In some instances, the method can further comprise the controller allocating an index number to the component through the field bus, and establishing a correlation between the physical address, the communication address and the index number of the component.

In some instances, the controller can allocate different index numbers to the redundant components of the same type through the field bus if the control system comprises redundant components of the same type.

In some instances, the process of the controller allocating the communication address to the component through the field bus and establishing the correlation between the physical address and the communication address of the component can comprise the controller allocating a Controller Area Network Identification (CANID) to the component through the field bus and establishing a correlation between the physical address and the CANID of the component. The CANID can be a communication address of the component in a Controller Area Network (CAN) communication bus.

In some instances, the process of the controller allocating the index number to the component through the field bus and establishing the correlation between the physical address, the communication address and the index number of the component can comprise the controller allocating the index number to the component through the field bus and establishing a correlation between the physical address, a CANID and the index number of the component.

In some instances, the control system can comprises at least one inertial measurement component, each one of the at least one inertial measurement component having a unique physical address. The process of the controller allocating the communication address to the component through the field bus and establishing the correlation between the physical address and the communication address of the component can comprise the controller allocating a unique communication address to each one of the at least one inertial measurement component through the field bus, establishing a correlation between the physical address and the communication address of each one of the at least one inertial measurement component, and providing the communication address to each one of the at least one inertial measurement component, such that each one of the at least one inertial measurement component performs a data communication with the controller using the communication address.

In some instances, the method can further comprise the controller allocating a unique index number to each one of the at least one inertial measurement component through the field bus and establishing a correlation between the physical address, the communication address and the index number of each one of the at least one inertial measurement component.

In some instances, the control system can comprise at least one positioning component, each one of the at least one positioning component having a unique physical address. The process of the controller allocating the communication address to the component through the field bus and establishing the correlation between the physical address and the communication address of the component can comprise the controller allocating a unique communication address to each one of the at least one positioning component through the field bus, establishing a correlation between the physical address and the communication address of each one of the at least one positioning component, and providing the communication address to each one of the at least one positioning component, such that each one of the at least one positioning component performs a data communication with the controller using the communication address.

In some instances, the method can further comprise the controller allocating a unique index number to each one of the at least one positioning component through the field bus and establishing a correlation between the physical address, the communication address and the index number of each one of the at least one positioning component.

In some instances, the control system can comprise at least one magnetic sensor component, each one of the at least one magnetic sensor component having a unique physical address. The process of the controller allocating the communication address to the component through the field bus and establishing the correlation between the physical address and the communication address of the component can comprise the controller allocating a unique communication address to each one of the at least one magnetic sensor component through the field bus, establishing a correlation between the physical address and the communication address of each one of the at least one magnetic sensor component, and providing the communication address to each one of the at least one magnetic sensor component such that the at least one magnetic sensor component performs data communication with the controller using the respective communication address.

In some instances, the control system can comprise at least one magnetic sensor component, each one of the at least one magnetic sensor component having a unique physical address. The method can further comprise the controller allocating a unique index number to each one of the at least one magnetic sensor component through the field bus and establishing a correlation between the physical address, the communication address and the index number of each one of the at least one magnetic sensor component.

In some instances, the method can further comprise the controller receiving an index number of the component from a user through an interface for configuration and establishing a correlation between the physical address, the communication address and the index number of the component.

The method for bus addressing of the first aspect of the disclosure can allocate a communication address to a component of a control system through a field bus and establish a correlation between the communication address and a physical address of the component. With the method for addressing, each component can have a unique communication address, ensuring a normal communication between the components and between the components and the controller and improving an efficiency and a quality in the information interaction. The method for addressing is not limited by the hardware interface, enabling an expansion of the control system.

A second aspect of the disclosure provides a device for bus addressing. The device can comprise a receiving unit configured to receive handshaking information from a component of a control system; and a first allocation and establishment unit configured to allocate a communication address to the component through a field bus and establish a correlation between a physical address and the communication address of the component.

In some instances, the device can further comprise a second allocation and establishment unit configured to allocate an index number to the component through the field bus and establish a correlation between the physical address, the communication address and the index number of the component.

In some instances, the second allocation and establishment unit can be configured to allocate different index numbers to redundant components of the same type through the field bus and establish a correlation between the physical address, the communication address and the index number of each component if the control system comprises redundant components of the same type.

In some instances, the first allocation and establishment unit can be configured to allocate a CANID to the component through the field bus and establish a correlation between the physical address and the CANID of the component. The CANID can be a communication address of the component in a CAN communication bus.

In some instances, the second allocation and establishment unit can be configured to allocate an index number to the component through the field bus and establish a correlation between the physical address, the CANID and the index number of the component.

In some instances, the control system can comprise at least one inertial measurement component, each one of the at least one inertial measurement component having a unique physical address. The first allocation and establishment unit can be configured to allocate a unique communication address to each one of the at least one inertial measurement component through the field bus, establish a correlation between the physical address and the communication address of each one of the at least one inertial measurement component, and provide the communication address to each one of the at least one inertial measurement component, such that each one of the at least one inertial measurement component performs a data communication with the controller using the communication address.

In some instances, the control system can comprise at least one inertial measurement component, each one of the at least one inertial measurement component having a unique physical address. The second allocation and establishment unit can be configured to allocate a unique index number to each one of the at least one inertial measurement component through the field bus and establish a correlation between the physical address, the communication address and the index number of each one of the at least one inertial measurement component In some instances, the control system can comprise at least one positioning component, each one of the at least one positioning component having a unique physical address. The first allocation and establishment unit can be configured to allocate a unique communication address to each one of the at least one positioning component through the field bus, establish a correlation between the physical address and the communication address of each one of the at least one positioning component, and provide the communication address to each one of the at least one positioning component, such that each one of the at least one positioning component performs a data communication with the controller using the communication address.

In some instances, the control system can comprise at least one positioning component, each one of the at least one positioning component having a unique physical address. The second allocation and establishment unit can be configured to allocate a unique index number to each one of the at least one positioning component through the field bus and establish a correlation between the physical address, the communication address and the index number of each one of the at least one positioning component.

In some instances, the control system can comprise at least one magnetic sensor component, each magnetic sensor component having a unique physical address. The first allocation and establishment unit can be configured to allocate a unique communication address to each one of the at least one magnetic sensor component through the field bus, establish a correlation between the physical address and the communication address of each one of the at least one magnetic sensor component, and provide the communication address to each one of the at least one magnetic sensor component, such that each one of the at least one magnetic sensor component performs a data communication with the controller using the communication address.

In some instances, the control system can comprise at least one magnetic sensor component, each magnetic sensor component having a unique physical address. The second allocation and establishment unit can be configured to allocate a unique index number to each one of the least one magnetic sensor component through the field bus and establish a correlation between the physical address, the communication address and the index number of each one of the at least one magnetic sensor component.

In some instances, the device can further comprise a configuration and establishment unit configured to receive an index number of the component from a user through an interface for configuration and establish a correlation between the physical address, the communication address and the index number of the component.

The device for bus addressing of the second aspect of the disclosure can effect the method for bus addressing of the first aspect of the disclosure. A communication address can be allocated to a component of a control system through a field bus, and a correlation between the communication address and a physical address of the component can be established. With the addressing provided in the disclosure, each component can have a unique communication address, ensuring a normal communication between the components and between the components and the controller and improving an efficiency and a quality in the information interaction. The addressing provided in the disclosure is not limited by the hardware interface, enabling an expansion of the control system.

A third aspect of the disclosure provides a method for providing information. The method can comprise a controller receiving a viewing request with respect to a component of a control system; the controller searching for an index number of the component based on a correlation between a physical address, a communication address and an index number of each component which is established in advance; and the controller feeding back status indication information of the component to a human-machine interaction device, such that the human-machine interaction device provides to a user an operational status of the component using the index number. The status indication information can be information indicating the index number and the operational status of the component.

In some instances, the method can further comprise the controller receiving an index number of the component from the user through the human-machine interaction device and updating the correlation of the component using the index number set by the user.

In some instances, the operational status of the component can be obtained by the controller by the controller monitoring the operational status of the component based on the viewing request, the operational status including a normal and in use state, a normal but not in use state or a fault state.

In some instances, the process of the controller feeding back the status indication information of the component to the human-machine interaction device can comprise: the controller generating a text information from the operational status and the index number of the component; and the controller feeding back the text information to the human-machine interaction device, such that the human-machine interaction device displays the text information on a human-machine interaction interface.

In some instances, the process of the controller feeding back the status indication information of the component to the human-machine interaction device can comprise: the controller generating an indicator display control information from the operational status and the index number of the component; and the controller feeding back the indicator display control information to the human-machine interaction device, such that the human-machine interaction device controls an indicator on a human-machine interaction interface based on the indicator display control information.

In some instances, the process of the controller generating the indicator display control information from the operational status and the index number of the component can comprise: the controller generating the indicator display control information from the operational status and the index number of the component based on a preset rule, the indicator display control information including a display color and a flashing frequency of the indicator, the preset rule including different display colors being used to indicate different operational statuses and different flashing frequencies being used to indicate different index numbers.

In some instances, the preset rule can comprise red being used to indicate a component in a fault state, green being used to indicate a component in a normal but not in use state, blue being used to indicate a component in a normal and in use state, and the number of flashing being used to indicate an index number.

In some instances, the process of the controller feeding back the status indication information of the component to the human-machine interaction device can comprise: the controller generating an audio information from the operational status and the index number of the component; and the controller feeding back the audio information to the human-machine interaction device such that the human-machine interaction device plays the audio information.

In some instances, the control system can comprise at least one inertial measurement component. The controller can receive the viewing request with respect to the at least one inertial measurement component, search for an index number of the at least one inertial measurement component based on a correlation between a physical address, a communication address and an index number of the at least one inertial measurement component which is established in advance, and feed back the status indication information of the at least one inertial measurement component to the human-machine interaction device, such that the human-machine interaction device provides to the user the operational status of the at least one inertial measurement component using the index number.

In some instances, the control system can comprise at least one positioning component. The controller can receive the viewing request with respect to the at least one positioning component, search for an index number of the at least one positioning component based on a correlation between a physical address, a communication address and an index number of the at least one positioning component which is established in advance, and feed back the status indication information of the at least one positioning component to the human-machine interaction device, such that the human-machine interaction device provides to the user the operational status of the at least one positioning component using the index number.

In some instances, the control system can comprise at least one magnetic sensor component. The controller can receive the viewing request with respect to the at least one magnetic sensor component, search for an index number of the at least one magnetic sensor component based on a correlation between a physical address, a communication address and an index number of the at least one magnetic sensor component which is established in advance, and feed back the status indication information of the at least one magnetic sensor component to the human-machine interaction device, such that the human-machine interaction device provides to the user the operational status of the at least one magnetic sensor component using the index number.

With the method for providing information of the third aspect of the disclosure, the controller can search for the index number and the operational status of the component, and feed back the status indication information of the component to the human-machine interaction device, such that the human-machine interaction device can display the index number and the operational status of the component. The controller can establish a correlation between the index number and the communication address of the component in advance. Therefore, the operational status of the component can be provided to the user in a timely manner when the user triggers a search request. The displaying of the index number can enable the user to rapidly locate the component and learn the operational status of the component.

A fourth aspect of the disclosure provides a device for providing information. The device can comprise a receiving unit configured to receive a viewing request with respect to a component of a control system; a searching unit configured to search for an index number of the component based on a correlation between a physical address, a communication address and an index number of each component which is established in advance; and a feedback unit configured to feed back status indication information of the component to a human-machine interaction device, such that the human-machine interaction device provides to a user an operational status of the component using the index number. The status indication information can be information indicating the index number and the operational status of the component.

In some instances, the device can further comprise an update unit configured to receive an index number of the component from the user through the human-machine interaction device and update the correlation of the component using the index number set by the user.

In some instances, the device can further comprise a state information obtaining unit configured to monitor the operational status of the component based on the viewing request, the operational status including a normal and in use state, a normal but not in use state or a fault state.

In some instances, the feedback unit can comprise a text information generation subunit configured to generate a text information from the operational status and the index number of the component; and a text information feedback subunit configured to feed back the text information to the human-machine interaction device, such that the human-machine interaction device displays the text information on a human-machine interaction interface.

In some instances, the feedback unit can comprise an indicator control information generation subunit configured to generate an indicator display control information from the operational status and the index number of the component; and an indicator control information feedback subunit configured to feed back the indicator display control information to the human-machine interaction device, such that the human-machine interaction device controls an indicator on a human-machine interaction interface based on the indicator display control information.

In some instances, the indicator control information generation subunit can be configured to generate the indicator display control information from the operational status and the index number of the component based on a preset rule, the indicator display control information including a display color and a flashing frequency of the indicator, the preset rule including different display colors being used to indicate different operational statuses and different flashing frequencies being used to indicate different index numbers.

In some instances, the feedback unit can comprise an audio information generation subunit configured to generate an audio information from the operational status and the index number of the component; and an audio information feedback subunit configured to feed back the audio information to the human-machine interaction device, such that the human-machine interaction device plays the audio information.

In some instances, the control system can comprise at least one inertial measurement component. The receiving unit can be configured to receive the viewing request with respect to the at least one inertial measurement component. The searching unit can be configured to search for an index number of the at least one inertial measurement component based on a correlation between a physical address, a communication address and an index number of the at least one inertial measurement component which is established in advance. The feedback unit can be configured to feed back the status indication information of the at least one inertial measurement component to the human-machine interaction device, such that the human-machine interaction device provides to the user the operational status of the at least one inertial measurement component using the index number.

In some instances, the control system can comprise at least one positioning component. The receiving unit can be configured to receive the viewing request with respect to the at least one positioning component. The searching unit can be configured to search for an index number of the at least one positioning component based on a correlation between a physical address, a communication address and an index number of the at least one positioning component which is established in advance. The feedback unit can be configured to feed back the status indication information of the at least one positioning component to the human-machine interaction device, such that the human-machine interaction device provides to the user the operational status of the at least one positioning component using the index number In some instances, the control system can comprise at least one magnetic sensor component. The receiving unit can be configured to receive the viewing request with respect to the at least one magnetic sensor component. The searching unit can be configured to search for an index number of the at least one magnetic sensor component based on a correlation between a physical address, a communication address and an index number of the at least one magnetic sensor component which is established in advance. The feedback unit can be configured to feed back the status indication information of the at least one magnetic sensor component to the human-machine interaction device, such that the human-machine interaction device provides to the user the operational status of the at least one magnetic sensor component using the index number.

The device for providing information of the fourth aspect of the disclosure can be applied of a control system effecting the method of addressing of the first aspect of the disclosure. The status indication information indicating the operational status of the component can be provided to the user by means of information interaction with the human-machine interaction device. The user can rapidly locate the component and learn the operational status of the component by displaying the index number to the user.

A fifth aspect of the disclosure provide a method for providing information. The method can comprise a human-machine interaction device receiving from a user a viewing request with respect to a component of a control system and sending the viewing request to a controller; the human-machine interaction device receiving from the controller an status indication information of the component. The status indication information can be information indicating an index number and an operational status of the component; and the human-machine interaction device providing to the user the operational status of the component based on the status indication information.

In some instances, the process of the human-machine interaction device providing to the user the index number and the operational status of the component based on the status indication information can comprise the human-machine interaction device displaying a text information indicating the index number and the operational status of the component on a human-machine interaction interface.

In some instances, the process of the human-machine interaction device providing to the user the index number and the operational status of the component based on the status indication information can comprise the human-machine interaction device playing to the user an audio information indicating the index number and the operational status of the component.

In some instances, the process of the human-machine interaction device providing to the user the index number and the operational status of the component based on the status indication information can comprise the human-machine interaction device controlling an indicator on the human-machine interaction interface to display the index number and the operational status of the component based on a preset rule and the status indication information.

In some instances, the preset rule can comprise different display colors being used to indicate different operational statuses and different flashing frequencies being used to indicate different index numbers.

In some instances, the preset rule can comprise red being used to indicate a component in a fault state, green being used to indicate a component in a normal but not in use state, blue being used to indicate a component in a normal and in use state, and the number of flashing being used to indicate an index number.

In some instances, the control system can comprises at least one inertial measurement component. The human-machine interaction device can receive from the user the viewing request with respect to the at least one inertial measurement component and sends the viewing request to the controller. The human-machine interaction device can receive from the controller the status indication information of the at least one inertial measurement component, the status indication information being information indicating the index number and the operational status of the at least one inertial measurement component. The human-machine interaction device can provide to the user the operational status of the at least one inertial measurement component based on the status indication information.

In some instances, the control system can comprise at least one positioning component. The human-machine interaction device can receive from the user the viewing request with respect to the at least one positioning component and sends the viewing request to the controller. The human-machine interaction device can receive from the controller the status indication information of the at least one positioning component, the status indication information being information indicating the index number and the operational status of the at least one positioning component. The human-machine interaction device can provide to the user the operational status of the at least one positioning component based on the status indication information.

In some instances, the control system can comprise at least one magnetic sensor component. The human-machine interaction device can receive from the user the viewing request with respect to the at least one magnetic sensor component and sends the viewing request to the controller. The human-machine interaction device can receive from the controller the status indication information of the at least one magnetic sensor component, the status indication information being information indicating the index number and the operational status of the at least one magnetic sensor component. The human-machine interaction device can provide to the user the operational status of the at least one magnetic sensor component based on the status indication information.

In some instances, the human-machine interaction device can be a remote control device.

In some instances, the remote control device can be a remote controller of an unmanned aerial vehicle.

The method for providing information of the fifth aspect of the disclosure can be applied in a human-machine interaction device. The human-machine interaction device can send a viewing request to the controller, receive the status indication information of the component, and provide to the user the index number and the operational status of the component. The user can rapidly locate the component and learn the operational status of the component by displaying the index number to the user.

A sixth aspect of the disclosure provides a device for providing information. The device can comprise a request sending unit configured to receive from a user a viewing request with respect to a component of a control system and send the viewing request to a controller; a receiving unit configured to receive from the controller status indication information of the component. The status indication information can be information indicating an index number and an operational status of the component; and an information providing unit configured to provide to the user the operational status of the component based on the status indication information.

In some instances, the information providing unit can be configured to display a text information indicating the index number and the operational status of the component on a human-machine interaction interface.

In some instances, the information providing unit can be configured to play to the user an audio information indicating the index number and the operational status of the component.

In some instances, the information providing unit can be configured to control an indicator on the human-machine interaction interface to display the index number and the operational status of the component based on a preset rule and the status indication information.

In some instances, the control system can comprise at least one inertial measurement component. The request sending unit can be configured to receive from the user the viewing request triggered with respect to the at least one inertial measurement component and send the viewing request to the controller. The receiving unit can be configured to receive from the controller the status indication information of the at least one inertial measurement component, the status indication information being information indicating the index number and the operational status of the at least one inertial measurement component. The information providing unit can be configured to provide to the user the operational status of the at least one inertial measurement component based on the status indication information.

In some instances, the control system can comprise at least one positioning component. The request sending unit can be configured to receive from the user the viewing request with respect to the at least one positioning component and send the viewing request to the controller. The receiving unit can be configured to receive from the controller the status indication information of the at least one positioning, the status indication information being information indicating the index number and the operational status of the at least one positioning component. The information providing unit can be configured to provide to the user the operational status of the at least one positioning component based on the status indication information.

In some instances, the control system can comprise at least one magnetic sensor component. The request sending unit can be configured to receive from the user the viewing request with respect to the at least one magnetic sensor component and send the viewing request to the controller. The receiving unit can be configured to receive from the controller the status indication information of the at least one magnetic induction, the status indication information being information indicating the index number and the operational status of the at least one magnetic sensor component. The information providing unit can be configured to provide to the user the operational status of the at least one magnetic sensor component based on the status indication information.

The device for providing information of the sixth aspect of the disclosure can effect the method for providing information of the fifth aspect of the disclosure. The device for providing information can send a viewing request to the controller, receive the status indication information of the component, and provide to the user the index number and the operational status of the component. The user can rapidly locate the component and learn the operational status of the component by displaying the index number to the user.

A seventh aspect of the disclosure provides a device for bus addressing. The device can comprise at least one processor, at least one network interface or other communication interface, a memory and at least one field bus, the memory storing program instructions, the processor performing a process according to the program instructions. The process can comprise receiving handshaking information from a component of a control system; and allocating a communication address to the component through the field bus and establishing a correlation between a physical address and the communication address of the component.

An eighth aspect of the disclosure provides a device for providing information. The device can comprise at least one processor, at least one network interface or other communication interface, a memory and at least one field bus, the memory storing program instructions, the processor performing a process according to the program instructions. The process can comprise receiving a viewing request with respect to a component of a control system; searching for an index number of the component based on a correlation between a physical address, a communication address and an index number of each component which is established in advance; and feeding back status indication information of the component to a human-machine interaction device, such that the human-machine interaction device provides to a user an operational status of the component using the index number. The status indication information can be information indicating the index number and the operational status of the component.

A ninth aspect of the disclosure provides a device for providing information. The device can comprise at least one processor, at least one network interface or other communication interface, a memory and at least one field bus, the memory storing program instructions, the processor performing a process according to the program instructions. The process can comprise receiving from a user a viewing request with respect to a component of a control system and sending the viewing request to a controller; receiving from the controller status indication information of the component, wherein the status indication information being information indicating an index number and an operational status of the component; and providing to a user the operational status of the component based on the status indication information.

BRIEF DESCRIPTION OF THE DRAWINGS

Technical solutions of embodiments of the disclosure will be described with reference to the accompanying drawings. It will be apparent to those skilled in the art that, the drawings merely illustrate some embodiments of the disclosure, and other drawings can be conceived without any inventive effort.

DETAILED DESCRIPTION OF THE DISCLOSURE

A better understanding of the disclosure will be obtained by reference to the following detailed description that sets forth illustrative embodiments with reference to the drawings.

A method for bus addressing in accordance with a first aspect of the disclosure will be described.

Figure 1:
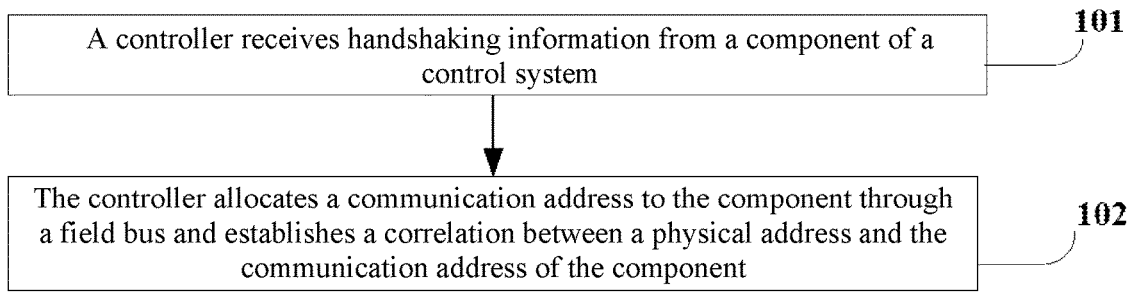
FIG. 1 shows an example of a flowchart of a method for bus addressing of a first embodiment in accordance with a first aspect of the disclosure.

FIG. 1 shows an example of a flowchart of a method for bus addressing of a first embodiment in accordance with a first aspect of the disclosure. As shown in FIG. 1, the method can comprise steps 101 and 102.

In step 101, a process can be performed in which a controller can receive handshaking information from a component of a control system.

In step 102, a process can be performed in which the controller can allocate a communication address to the component through a field bus and establish a correlation between a physical address and the communication address of the component.

It will be appreciated that, a field of application and a type of the control system are not limited, and a function and a type of the components of the control system are not limited.

In some embodiments, the component of the control system can first send handshaking information to the controller. Upon receiving the handshaking information, the controller can allocate a communication address to the component and establish a correlation between a physical address and the communication address of the component, such that the component is provided with a unique communication address. The component can thus perform an information interaction with other components of the control system and perform an information interaction with the controller, ensuring a normal communication of components in the system. A maintenance personnel can determine the physical address of the component from the communication address based on the correlation between the physical address and the communication address of the component established by the controller, making it convenient for subsequent maintenance.

From the method shown in FIG. 1, the inventor further contemplates a situation where various types of components can be provided of the control system. An alternative technical solution is proposed by the inventor where a further step is performed by the method shown in FIG. 1 to facilitate the subsequent maintenance of the maintenance personnel. In the additional step, a process can be performed in which the controller can allocate an index number to the component through the field bus and establish a correlation between the physical address, the communication address and the index number of the component.

In some instances, the index number can comprise a number, a letter or a combination thereof. A format of the index number is not limited in the disclosure.

In the alternative technical solution, a correlation between the physical address, the communication address and the index number can be established by the controller. The maintenance personnel can determine a type of the component based on the index number and then position the component based on the communication address and the physical address, such that a maintenance efficiency can be improved.

From the alternative solution as discussed hereinabove, the inventor further contemplates a situation where redundant components of the same type can be provided of the control system. An alternative technical solution is proposed by the inventor where an additional step is performed by the alternative solution as discussed hereinabove. In the additional step, a process can be performed in which the controller allocates different index numbers to the redundant components of the same type through the field bus if the control system comprises redundant components of the same type.

The redundant components can be two or more identical components of the control system, one of the two or more identical components being the redundant component of another. The user cannot distinguish the redundant components as they are provided with the same type, name and performance. Therefore, difference index numbers can be allocated to the redundant components of the same type. In some instances, however, an identical index number can be allocated to components of different types as the user can distinguish the components by referring to a component type even if the index numbers are identical.

In the alternative technical solution as discussed hereinabove, the controller can allocate different index numbers to redundant components of the same type. The maintenance personnel can identify a component based on the component type and the index number and then position the component based on the correlation between the communication address and the physical address, such that a maintenance efficiency can be improved.

In some instances, in order to further improve the user experience, the disclosure provides an alternative technical solution where a further step is performed by the method shown in FIG. 1. In the additional step, a process can be performed in which the controller can receive from a user an index number of the component through an interface for configuration and establish a correlation between the physical address, the communication address and the index number of the component.

In the alternative technical solution, an interface for configuration can to provided to the user. The user can configure the index number of the component according to his/her own preferences, such that the user can clearly understand the index number of the component to further improve the user experience.

On basis of the method shown in FIG. 1, the inventor provides an alternative technical solution in view of a performance of Controller Area Network (CAN) field bus. The alternative technical solution will be described with reference to FIG. 2.

Figure 2:
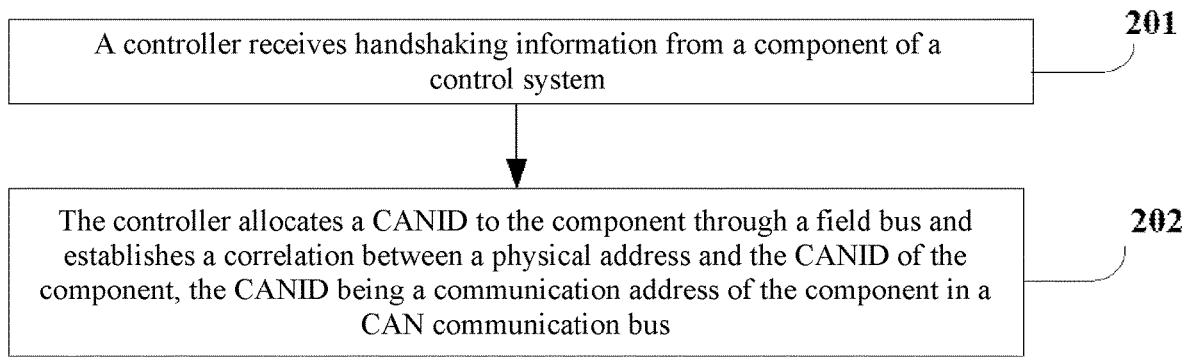
FIG. 2 shows an example of a flowchart of a method for bus addressing of a second embodiment in accordance with a first aspect of the disclosure.

FIG. 2 shows an example of a flowchart of a method for bus addressing of a second embodiment in accordance with a first aspect of the disclosure. As shown in FIG. 2, the method can comprise steps 201 and 202.

In step 201, a process can be performed in which a controller receives handshaking information from a component of a control system.

In step 202, a process can be performed in which the controller allocates a Controller Area Network Identification (CANID) to the component through a field bus and establishes a correlation between a physical address and the CANID of the component, the CANID being a communication address of the component in a CAN communication bus.

The CAN field bus is a content-oriented addressing solution, therefore a control system can be established with a high performance and flexibility. A new node can be added to the CAN bus without modifying the hardware or software configuration. The CANID can be used to effect an arbitration in the CAN bus. A lower ID value can indicate a higher priority of a message sent from a node. In case two messages are sent simultaneously from nodes having different ID values, the arbitration mechanism can enable a node having a lower ID value to take control and occupy the bus and thus successfully send out a message while a node having a higher ID value can exit. The ID domain can comprise 11 bits or 29 bits. The ID value and a meaning of the ID can be predefined by the user as a CAN high-layer protocol management. In some instances, the ID can further function to effect a message filtering of a receiver. For instance, the receiver can set a range of ID from which messages can be accepted, such that the receiver can filter out unnecessary information to reduce a processing burden of the central processor.

The inventor has recognized various advantages of CAN field bus including (1) easy to expand the control system and add new components; (2) excellent anti-interference performance; (3) prioritized communication, less arbitration time for bus contention to avoid network failure; and (4) automatic disabling output function and disconnecting a failing node.

With the method shown in FIG. 2, in addition to allocating a unique communication address to the component and ensuring a normal communication between components, an operation performance of the control system can be improved by taking advantages of the CAN field bus as discussed hereinabove.

In some instances, an additional step can be performed by the method shown in FIG. 2. In the additional step, a process can be performed in which the controller can allocate an index number to the component through the field bus and establish a correlation between the physical address, the CANID and the index number of the component.

With the controller allocating the index number to the component using the CAN field bus and establishing a correlation between the physical address, the CANID and the index number of the component, the maintenance personnel can rapidly position the component by virtue of enhanced information, such that a maintenance efficiency can be improved.

The method for bus addressing in accordance with a first aspect of the disclosure will be described in combination with a control system of an unmanned aerial vehicle.

It will be appreciated that, the control system of an unmanned aerial vehicle in the disclosure can refer to a navigation system of the unmanned aerial vehicle. The navigation system can be used to provide navigation information to the unmanned aerial vehicle to effect a safe and reliable flight.

In some instances, the navigation system can be a navigation system based on inertial navigation. Optionally, the navigation system can be a navigation system based on positioning satellite navigation. Optionally, the navigation system can be a navigation system based on Doppler navigation. It will be appreciated that, the navigation system can be a hybrid navigation system. The method for bus addressing as applied in different navigation systems will be described with reference to FIGS. 3, 4, 5 and 6.

Figure 3:
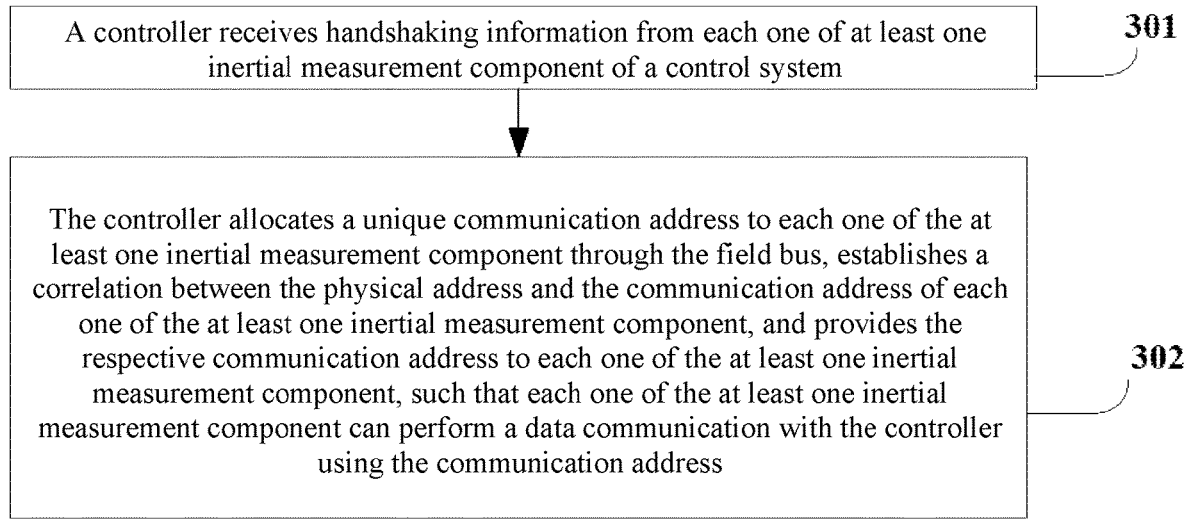
FIG. 3 shows an example of a flowchart of a method for bus addressing of a third embodiment in accordance with a first aspect of the disclosure.

FIG. 3 shows an example of a flowchart of a method for bus addressing in accordance with a third aspect of the disclosure. The control system associated with the method shown in FIG. 3 can be a navigation system based on inertial navigation. The control system can comprise at least one inertial measurement component, each of which having a unique physical address. As shown in FIG. 3, the method can comprise steps 301 and 302.

In step 301, a process can be performed in which a controller receives handshaking information from each one of at least one inertial measurement component of the control system.

In step 302, a process can be performed in which the controller allocates a unique communication address to each one of the at least one inertial measurement component through the field bus, establishes a correlation between the physical address and the communication address of each one of the at least one inertial measurement component, and provides the respective communication address to each one of the at least one inertial measurement component, such that each one of the at least one inertial measurement component can perform a data communication with the controller using the communication address.

In some instances, an additional step can be performed by the method shown in FIG. 3. In the additional step, a process can be performed in which the controller allocates a unique index number to each inertial measurement component through the field bus and establishes a correlation between the physical address, the communication address and the index number of each one of the at least one inertial measurement component.

Figure 4:
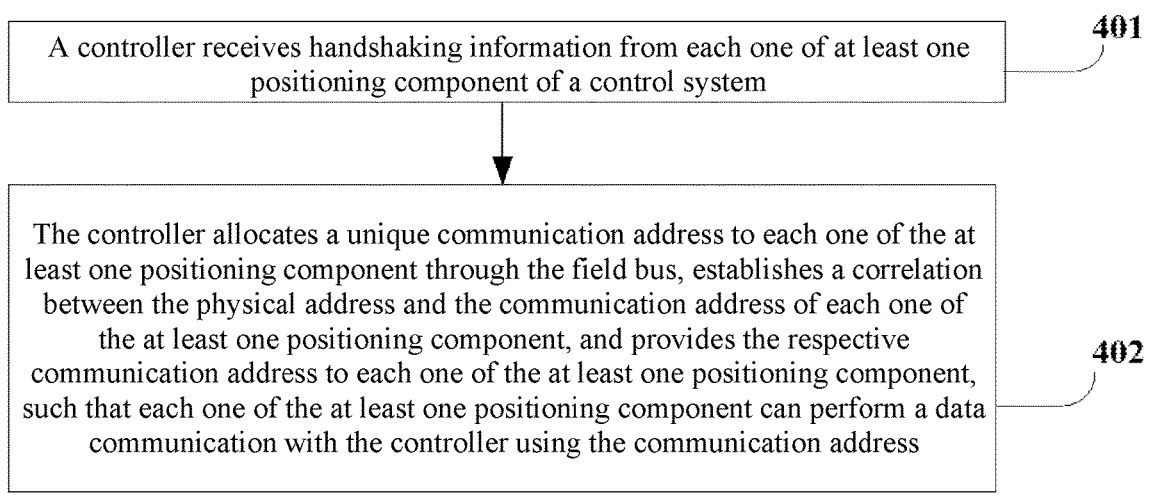
FIG. 4 shows an example of a flowchart of a method for bus addressing of a fourth embodiment in accordance with a first aspect of the disclosure.

FIG. 4 shows an example of a flowchart of a method for bus addressing in accordance with a fourth aspect of the disclosure. The control system associated with the method shown in FIG. 4 can be a navigation system based on positioning satellite navigation. The control system can comprise at least one positioning component, each of which having a unique physical address. As shown in FIG. 4, the method can comprise steps 401 and 402.

In step 401, a process can be performed in which a controller receives handshaking information from each one of the at least one positioning component of the control system.

In step 402, a process can be performed in which the controller allocates a unique communication address to each one of the positioning component through the field bus, establishes a correlation between the physical address and the communication address of each one of the at least one positioning component, and provides the communication address to each one of the at least one positioning component, such that each one of the at least one positioning component can perform a data communication with the controller using the communication address.

In some instances, an additional step can be performed by the method shown in FIG. 4. In the additional step, a process can be performed in which the controller allocates a unique index number to each positioning component through the field bus and establishes a correlation between the physical address, the communication address and the index number of each one of the at least one positioning component.

The control system associated with the method shown in FIG. 4 can be a component capable of effecting a positioning using a positioning system. In some instances, the positioning system can be GPS (Global Positioning System), Chinese BeiDou navigation system or Galileo navigation system. In some instances, the positioning component is a GPS component which comprises a GPS sensor to measure position data. The GPS sensor can be a sensor which uses GPS system to measure a location and a speed of a carrier in real time. The GPS sensor can be referred to as GPS receiver which receives a signal from a GPS satellite using an antenna and outputs a real-time longitude, latitude and attitude information.

Optionally, the positioning component can comprise a combination of any one or more of a GPS sensor, a BeiDou positioning sensor or a GLONASS positioning sensor.

Figure 5:
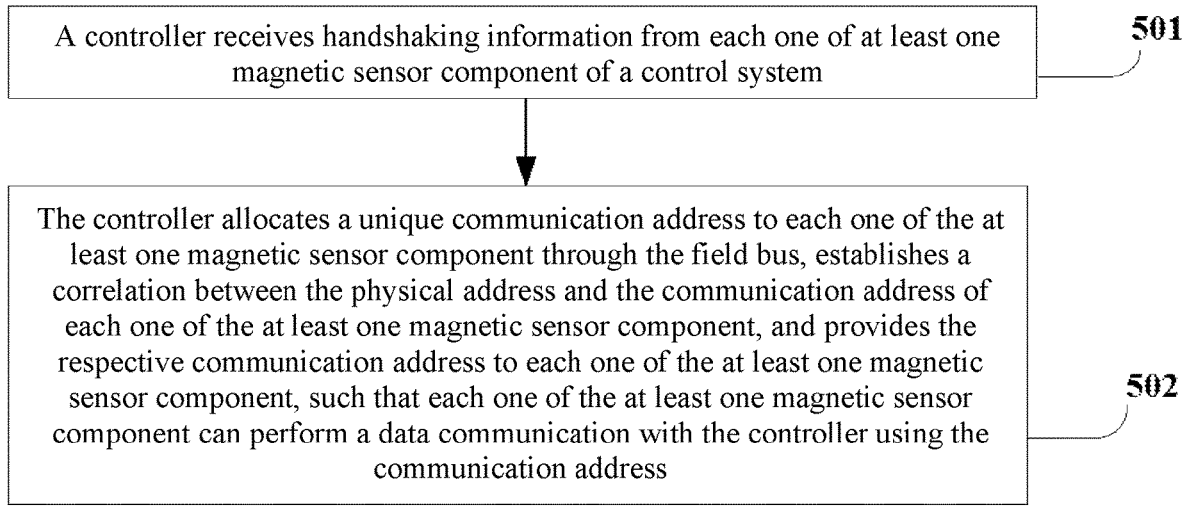
FIG. 5 shows an example of a flowchart of a method for bus addressing of a fifth embodiment in accordance with a first aspect of the disclosure.

FIG. 5 shows an example of a flowchart of a method for bus addressing in accordance with a fifth aspect of the disclosure. The control system associated with the method shown in FIG. 5 can be a navigation system based on Doppler navigation. The control system can comprise at least one magnetic sensor component, each of which having a unique physical address. As shown in FIG. 5, the method can comprise the steps 501 and 502.

In step 501, a process can be performed in which a controller receives handshaking information from each one of the at least one magnetic sensor component of the control system.

In step 502, a process can be performed in which the controller allocates a unique communication address to each one of the magnetic sensor component through the field bus, establishes a correlation between the physical address and the communication address of each one of the at least one magnetic sensor component, and provides the communication address to each one of the at least one magnetic sensor component, such that each one of the at least one magnetic sensor component can perform a data communication with the controller using the communication address.

In some instances, an additional step can be performed by the method shown in FIG. 5. In the additional step, a process can be performed in which the controller allocates a unique index number to each magnetic sensor component through the field bus and establishes a correlation between the physical address, the communication address and the index number of each one of the at least one magnetic sensor component.

The control system associated with the method shown in FIG. 5 can be a compass component which comprises a compass sensor and measures a geomagnetic signal using the compass sensor.

It can be appreciated from the methods described with reference to FIGS. 3, 4 and 5 that, the disclosure provides a method for bus addressing which can be used with the navigation system of an unmanned aerial vehicle to expand the navigation system. The exemplary methods of FIGS. 3, 4 and 5 are provided with reference to a navigation system of a particular navigation technique. However, the disclosure is not limited to any particular application scenario. The method for bus addressing as provided in the disclosure can be used with a navigation system of any unmanned aerial vehicle.

The disclosure further provides a device for bus addressing, which substantially corresponds to the method for bus addressing as described hereinabove, to effect an application and implementation of the method.

Figure 6:
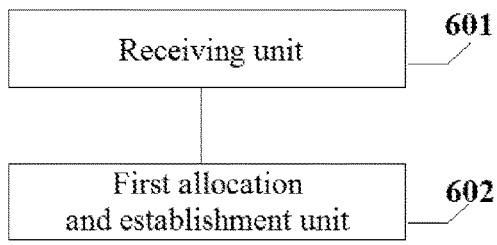
FIG. 6 shows an example of a configuration of a controller in accordance with a second aspect of the disclosure.

FIG. 6 shows an example of a configuration of a device for bus addressing in accordance with a second aspect of the disclosure. The device can be integrated in a controller. As shown in FIG. 6, the device can comprise a receiving unit 601 configured to receive handshaking information from a component of a control system, and a first allocation and establishment unit 602 configured to allocate a communication address to the component through a field bus and establish a correlation between a physical address and the communication address of the component.

In some instances, the device can further comprises a second allocation and establishment unit configured to allocate an index number to the component through the field bus and establish a correlation between the physical address, the communication address and the index number of the component.

In some instances, in case the control system comprises redundant components of the same type, the second allocation and establishment unit can be further configured to allocate different index numbers to the redundant components through the field bus and establish a correlation between the physical address, the communication address and the index number of each of the redundant components.

In some instances, the first allocation and establishment unit can be configured to allocate a CANID to the component through the field bus and establish a correlation between the physical address and the CANID of the component, the CANID being a communication address of the component in a CAN communication bus.

In some instances, the second allocation and establishment unit can be configured to allocate an index number to the component through the field bus and establish a correlation between the physical address, the CANID and the index number of the component.

In some instances, the control system can comprise at least one inertial measurement component, each one of the at least one inertial measurement component having a unique physical address. The first allocation and establishment unit can be configured to allocate a unique communication address to each one of the at least one inertial measurement component through the field bus, establish a correlation between the physical address and the communication address of each one of the at least one inertial measurement component, and provide the communication address to each one of the at least one inertial measurement component, such that each one of the at least one inertial measurement component can perform a data communication with the controller using the communication address.

In some instances, the control system can comprises at least one inertial measurement component, each one of the at least one inertial measurement component having a unique physical address. The second allocation and establishment unit can be configured to allocate a unique index number to each one of the at least one inertial measurement component through the field bus and establish a correlation between the physical address, the communication address and the index number of each one of the at least one inertial measurement component.

In some instances, the control system can comprise at least one positioning component, each one of the at least one positioning component having a unique physical address. The first allocation and establishment unit can be configured to allocate a unique communication address to each one of the at least one positioning component through the field bus, establish a correlation between the physical address and the communication address of each one of the at least one positioning component, and provide the communication address to each one of the at least one positioning component, such that each one of the at least one positioning component can perform a data communication with the controller using the communication address.

In some instances, the control system can comprise at least one positioning component, each one of the at least one positioning component having a unique physical address. The second allocation and establishment unit can be configured to allocate a unique index number to each one of the at least one positioning component through the field bus and establish a correlation between the physical address, the communication address and the index number of each one of the at least one positioning component.

In some instances, the control system can comprise at least one magnetic sensor component, each one of the at least one magnetic sensor component having a unique physical address. The first allocation and establishment unit can be configured to allocate a unique communication address to each one of the at least one magnetic sensor component through the field bus, establish a correlation between the physical address and the communication address of each one of the at least one magnetic sensor component, and provide the communication address to each one of the at least one magnetic sensor component, such that each one of the at least one magnetic sensor component can perform a data communication with the controller using the communication address.

In some instances, the control system can comprise at least one magnetic sensor component, each of the at least one magnetic sensor component having a unique physical address. The second allocation and establishment unit can be configured to allocate a unique index number to each one of the at least one magnetic sensor component through the field bus and establish a correlation between the physical address, the communication address and the index number of each one of the at least one magnetic sensor component.

In some instances, the device can further comprises a configuration and establishment unit configured to receive from a user an index number of the component through an interface for configuration and establish a correlation between the physical address, the communication address and the index number of the component.

With the device for bus addressing in accordance with the second aspect of the disclosure, a communication address can be allocated to a component of the control system and a correlation between the physical address and the communication address of the component can be established, such that the component is provided with a unique communication address. The component can thus perform an information interaction with other components of the control system and perform an information interaction with the controller, ensuring a normal communication of components in the system. A maintenance personnel can determine the physical address of the component from the communication address based on the correlation between the physical address and the communication address of the component established by the controller, making it convenient for subsequent maintenance.

On basis of the technical solutions provided in the first and second aspects of the disclosure, a third aspect of the disclosure provides a method for providing information. The method for providing information will be described with reference to FIG. 7.

Figure 7:
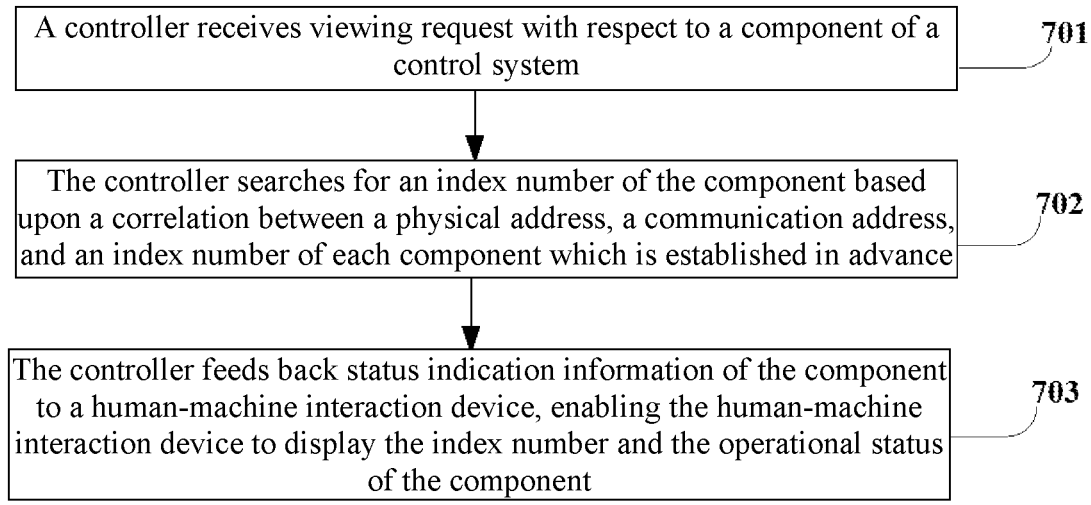
FIG. 7 shows an example of a flowchart of a method for providing information in accordance with a third aspect of the disclosure.

FIG. 7 shows an example of a flowchart of a method for providing information in accordance with a third aspect of the disclosure. The method can be performed at the controller. As shown in FIG. 7, the method can comprise steps 701 to 703.

In step 701, a process can be performed in which a controller receives a viewing request with respect to a component of a control system.

In step 702, a process can be performed in which the controller searches for an index number of the component based on a correlation between a physical address, a communication address and an index number of each component which is established in advance.

In step 703, a process can be performed in which the controller feeds back status indication information of the component to a human-machine interaction device, enabling the human-machine interaction device provides to a user the operational status of the component using the index number, the status indication information being information indicating the index number and the operational status of the component.

In some instances, an additional step can be performed by the method shown in FIG. 7. In the additional step, a process can be performed in which the controller receives from the user an index number of the component through the human-machine interaction device and updates the correlation of the component using the index number.

In some embodiments, in step 703 of FIG. 7, the controller can obtain the operational status of the component by monitoring the operational status of the component based on the viewing request, the operational status including a normal and in use state, a normal but not in use state, and a fault state.

In some instances, the process of the controller feeding back the status indication information of the component to the human-machine interaction device can comprises the controller generating a text information from the operational status and the index number of the component, and the controller feeding back the text information to the human-machine interaction device such that the human-machine interaction device displays the text information on a human-machine interaction interface.

In some instances, the process of the controller feeding back the status indication information of the component to the human-machine interaction device can comprise the controller generating an indicator display control information from the operational status and the index number of the component, and the controller feeding back the indicator display control information to the human-machine interaction device such that the human-machine interaction device controls an indicator on a human-machine interaction interface based on the indicator display control information.

In some instances, the process of the controller generating the indicator display control information from the operational status and the index number of the component can comprises the controller generating the indicator display control information from the operational status and the index number of the component based on a preset rule. The indicator display control information can include a display color and a flashing frequency of the indicator. The preset rule can include different display colors being used to indicate different operational statuses, and different flashing frequencies being used to indicate different index numbers.

For example, the preset rule can comprise red being used to indicate a component in a fault state, green being used to indicate a component in a normal but not in use state, blue being used to indicate a component in a normal and in use state, and the number of flashing being used to indicate an index number.

In some instances, the process of the controller feeding back the status indication information of the component to the human-machine interaction device can comprises the controller generating an audio information from the operational status and the index number of the component, and the controller feeding back the audio information to the human-machine interaction device such that the human-machine interaction device can play the audio information.

In some instances, the control system can comprise at least one inertial measurement component. The controller can receive a viewing request with respect to the at least one inertial measurement component, search for an index number of the at least one inertial measurement component based on a correlation between a physical address, a communication address and the index number of the at least one inertial measurement component which is established in advance, and feed back the status indication information of the at least one inertial measurement component to the human-machine interaction device such that the human-machine interaction device can provide to the user the operational status of the at least one inertial measurement component using the index number.

In some instances, the control system can comprise at least one positioning component. The controller can receive a viewing request with respect to the at least one positioning component, search for an index number of the at least one positioning component based on a correlation between a physical address, a communication address and the index number of the at least one positioning component established in advance, and feed back status indication information of the at least one positioning component to the human-machine interaction device such that the human-machine interaction device can provide to the user the operational status of the at least one positioning component using the index number.

In some instances, the control system can comprise at least one magnetic sensor component. The controller can receive a viewing request with respect to the at least one magnetic sensor component, search for an index number of the at least one magnetic sensor component based on a correlation between a physical address, a communication address and the index number of the at least one magnetic sensor component established in advance, and feed back status indication information of the at least one magnetic sensor component to the human-machine interaction device such that the human-machine interaction device can provide to the user the operational status of the at least one magnetic sensor component using the index number.

A fourth aspect of the disclosure provides a device for providing information. The device can be integrated in a controller to implement the method for providing information of the third aspect of the disclosure. The device for providing information will be described with reference to FIG. 8.

Figure 8:
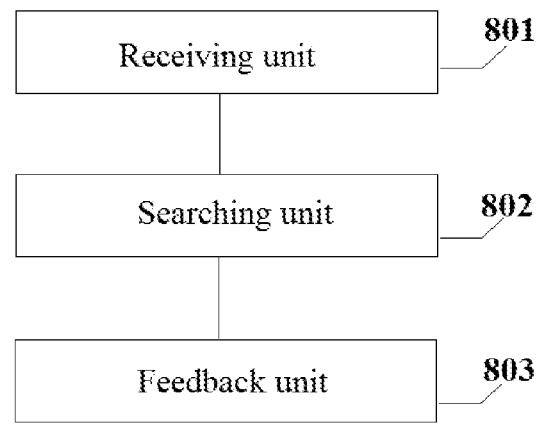
FIG. 8 shows an example of a configuration of a controller in accordance with a fourth aspect of the disclosure.

FIG. 8 shows an example of a configuration of a device for providing information in accordance with a fourth aspect of the disclosure. In some embodiments, the device for providing information can comprise a receiving unit 801 configured to receive a viewing request with respect to a component of a control system, a searching unit 802 configured to search for an index number of a component based on a correlation between a physical address, a communication address and an index number of each component established in advance, and a feedback unit 803 configured to feed back status indication information of the component to a human-machine interaction device such that the human-machine interaction device can provide to a user an operational status of the component using of the index number, the status indication information being information indicating the index number and the operational status of the component.

In some instances, the device can further comprise an update unit configured to receive from the user an index number of the component through the human-machine interaction device and update the correlation of the component using the index number set by the user.

In some instances, the device can further comprise a state information obtaining unit configured to monitor the operational status of the component based on the viewing request, the operational status including a normal and in use state, a normal but not in use state, and a fault state.

In some instances, the feedback unit can comprises a text information generation subunit configured to generate a text information from the operational status and the index number of the component, and a text information feedback subunit configured to feed back the text information to the human-machine interaction device such that the human-machine interaction device can display the text information on a human-machine interaction interface.

In some instances, the feedback unit can comprises an indicator control information generation subunit configured to generate an indicator display control information from the operational status and the index number of the component, and an indicator control information feedback subunit configured to feed back the indicator display control information to the human-machine interaction device such that the human-machine interaction device can control an indicator on a human-machine interaction interface based on the indicator display control information.

In some instances, the indicator control information generation subunit can be configured to generate the indicator display control information from the operational status and the index number of the component based on a preset rule. The indicator display control information can include a display color and a flashing frequency of the indicator. The preset rule can include different display colors being used to indicate different operational statuses, and different flashing frequencies being used to indicate different index numbers.

For example, the preset rule can comprise red being used to indicate a component in a fault state, green being used to indicate a component in a normal but not in use state, blue being used to indicate a component in a normal and in use state, and the number of flashing being used to indicate an index number.

In some instances, the feedback unit can comprises an audio information generation subunit configured to generate an audio information from the operational status and the index number of the component, and an audio information feedback subunit configured to feed back the audio information to the human-machine interaction device such that the human-machine interaction device can play the audio information.

In some instances, the control system can comprise at least one inertial measurement component. The receiving unit can be configured to receive a viewing request with respect to the at least one inertial measurement component. The searching unit can be configured to search for an index number of the at least one inertial measurement component based on a correlation between a physical address, a communication address and the index number of the at least one inertial measurement component established in advance. The feedback unit can be configured to feed back the status indication information of the at least one inertial measurement component to the human-machine interaction device such that the human-machine interaction device can provide to the user the operational status of the at least one inertial measurement component using the index number.

In some instances, the control system can comprise at least one positioning component. The receiving unit can be configured to receive a viewing request with respect to the at least one positioning component. The searching unit can be configured to search for an index number of the at least one positioning component based on a correlation between a physical address, a communication address and the index number of the at least one positioning component established in advance. The feedback unit can be configured to feed back the status indication information of the at least one positioning component to the human-machine interaction device such that the human-machine interaction device can provide to the user the operational status of the at least one positioning component using the index number.

In some instances, the control system can comprise at least one magnetic sensor component. The receiving unit can be configured to receive a viewing request with respect to the at least one magnetic sensor component. The searching unit can be configured to search for an index number of the at least one magnetic sensor component based on a correlation between a physical address, a communication address and the index number of the at least one magnetic sensor component established in advance. The feedback unit can be configured to feed back the status indication information of the at least one magnetic sensor component to the human-machine interaction device such that the human-machine interaction device can provide to the user the operational status of the at least one magnetic sensor component using the index number.

With the device for providing information in accordance with the fourth aspect of the disclosure, upon receiving a viewing request, the status indication information of a component can be provided to the human-machine interaction device by performing an information interaction with the human-machine interaction device, the status indication information indicating an index number and an operational status of the component. Therefore, the human-machine interaction device can directly indicate to a user the operational status of the component using the index number based on the status indication information of the component. The user can locate a particular component using the index number and learn the operation status of the component from the operational status.

A fifth aspect of the disclosure provides a method for providing information. The method can be performed in a human-machine interaction device. The method will be described with reference to FIG. 9.

Figure 9:
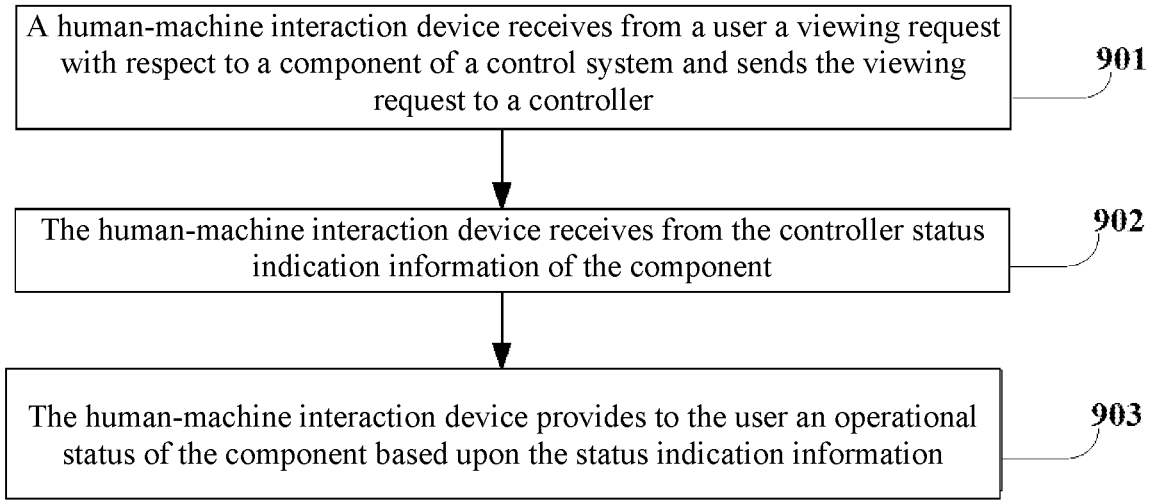
FIG. 9 shows an example of a flowchart of an method for providing information in accordance with a fifth aspect of the disclosure.

FIG. 9 shows an example of a flowchart of an method for providing information in accordance with a fifth aspect of the disclosure. In some embodiments, the method can comprise steps 901 to 903.

In step 901, a process can be performed in which a human-machine interaction device receives from a user a viewing request with respect to a component of a control system and sends the viewing request to a controller.

In step 902, a process can be performed in which the human-machine interaction device receives from the controller status indication information of the component, the status indication information being information indicating an index number and an operational status of the component.

In step 903, a process can be performed in which the human-machine interaction device provides to the user an operational status of the component based on the status indication information.

In some instances, the process of the human-machine interaction device providing to the user the index number and the operational status of the component based on the status indication information can comprise the human-machine interaction device displaying a text information indicating the index number and the operational status of the component on a human-machine interaction interface.

In some instances, the process of the human-machine interaction device providing to the user the index number and the operational status of the component based on the status indication information can comprise the human-machine interaction device playing to the user an audio information indicating the index number and the operational status of the component.

In some instances, the process of the human-machine interaction device providing to the user the index number and the operational status of the component based on the status indication information can comprise the human-machine interaction device controlling an indicator on the human-machine interaction interface to display the index number and the operational status of the component based on a preset rule and the status indication information.

In some instances, the preset rule can include different display colors being used to indicate different operational statuses and different flashing frequencies being used to indicate different index numbers.

For example, the preset rule can comprise red being used to indicate a component in a fault state, green being used to indicate a component in a normal but not in use state, blue being used to indicate a component in a normal and in use state, and the number of flashing being used to indicate an index number.

In some instances, the control system can comprise at least one inertial measurement component. The human-machine interaction device can receive from the user a viewing request with respect to the at least one inertial measurement component and send the viewing request to the controller. The human-machine interaction device can receive from the controller the status indication information of the at least one inertial measurement component, the status indication information being information indicating the index number and the operational status of the at least one inertial measurement component. The human-machine interaction device can provide to the user the operational status of the at least one inertial measurement component based on the status indication information.

In some instances, the control system can comprise at least one positioning component. The human-machine interaction device can receive from the user a viewing request with respect to the at least one positioning component and send the viewing request to the controller. The human-machine interaction device can receive from the controller the status indication information of the at least one positioning component, the status indication information being information indicating the index number and the operational status of the at least one positioning component. The human-machine interaction device can provide to the user the operational status of the at least one positioning component based on the status indication information.

In some instances, the control system can comprise at least one magnetic sensor component. The human-machine interaction device can receive from the user a viewing request with respect to the at least one magnetic sensor component and send the viewing request to the controller. The human-machine interaction device can receive from the controller the status indication information of the at least one magnetic sensor component, the status indication information being information indicating the index number and the operational status of the at least one magnetic sensor component. The human-machine interaction device can provide to the user the operational status of the at least one magnetic sensor component based on the status indication information.

In some instances, the human-machine interaction device can be a remote control device.

In some instances, the remote control device can be a remote controller of an unmanned aerial vehicle.

On basis of the method for providing information in accordance with the fifth aspect of the disclosure, a sixth aspect of the disclosure provides an device for providing information. The device will be described with reference to FIG. 10.

Figure 10:
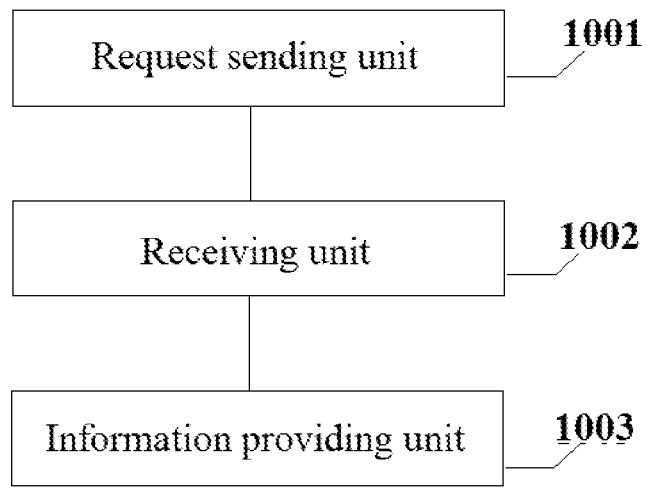
FIG. 10 shows an example of a configuration of a human-machine interaction device in accordance with a sixth aspect of the disclosure.

FIG. 10 shows an example of a configuration of a device for providing information in accordance with a sixth aspect of the disclosure. This device can be integrated in a human-machine interaction device. In some embodiments, the device can comprise a request sending unit 1001 configured to receive from a user a viewing request with respect to a component of a control system and send the viewing request to a controller, a receiving unit 1002 configured to receive from the controller status indication information of the component, the status indication information being information indicating the index number and the operational status of the component, and an information providing unit 1003 configured to provide to the user the operational status of the component based on the status indication information.

In some instances, the information providing unit can be configured to display a text information indicating the index number and the operational status of the component on a human-machine interaction interface.

In some instances, the information providing unit can be configured to play to the user an audio information indicating the index number and the operational status of the component.

In some instances, the information providing unit can be configured to control an indicator on the human-machine interaction interface to display the index number and the operational status of the component based on a preset rule and the status indication information.

In some instances, the control system can comprise at least one inertial measurement component. The request sending unit can be configured to receive from the user a viewing request with respect to the at least one inertial measurement component and send the viewing request to the controller. The receiving unit can be configured to receive from the controller the status indication information of the at least one inertial measurement component, the status indication information being information indicating the index number and the operational status of the at least one inertial measurement component. The information providing unit can be configured to provide to the user the operational status of the at least one inertial measurement component based on the status indication information.

In some instances, the control system can comprise at least one positioning component. The request sending unit can be configured to receive from the user a viewing request with respect to the at least one positioning component and send the viewing request to the controller. The receiving unit can be configured to receive from the controller the status indication information of the at least one positioning component, the status indication information being information indicating the index number and the operational status of the at least one positioning component. The information providing unit can be configured to provide to the user the operational status of the at least one positioning component based on the status indication information.

In some instances, the control system can comprise at least one magnetic sensor component. The request sending unit can be configured to receive from the user a viewing request with respect the at least one magnetic sensor component and send the viewing request to the controller. The receiving unit can be configured to receive from the controller the status indication information of the at least one magnetic induction, the status indication information being information indicating the index number and the operational status of the at least one magnetic sensor component. The information providing unit can be configured to provide to the user the operational status of the at least one magnetic sensor component based on the status indication information.

An operation principle of the device for providing information shown in FIG. 10 will be described by way of example with reference to FIG. 11.

Figure 11:
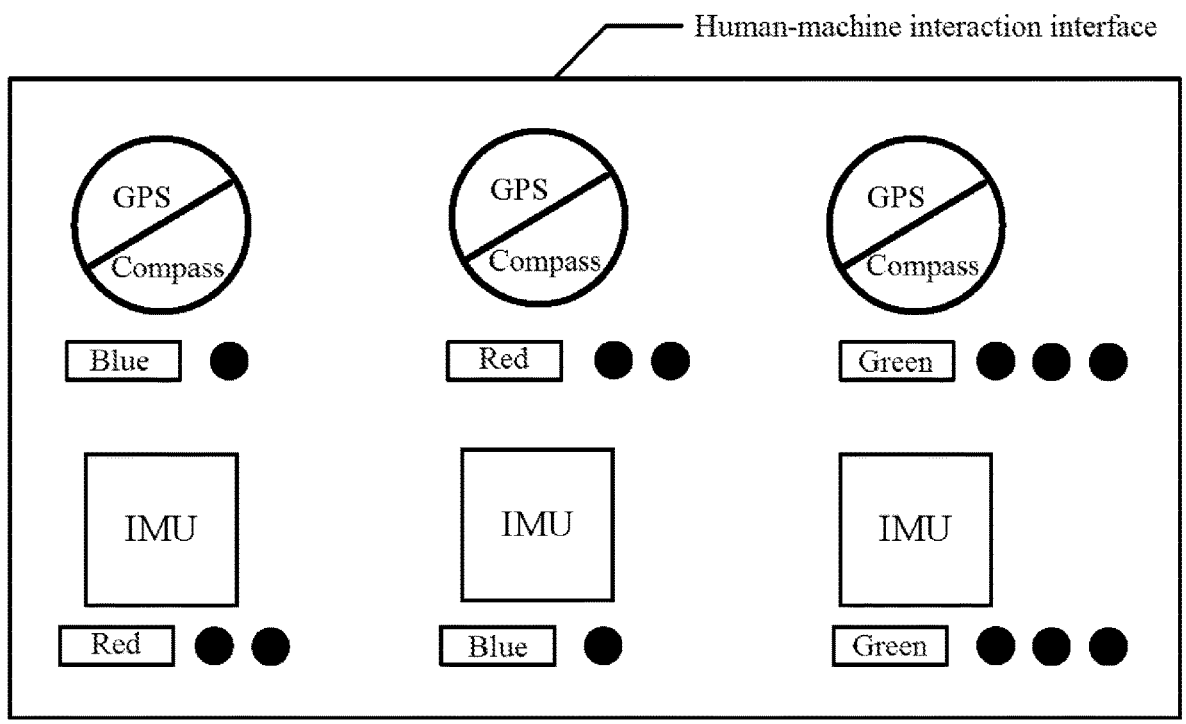
FIG. 11 shows an example of an operation diagram of a human-machine interaction device in accordance with a sixth aspect of the disclosure.

The device for providing information shown in FIG. 11 can be used at a remote control device of an unmanned aerial vehicle. In some embodiments, a navigation system of the unmanned aerial vehicle can comprise three sets of redundant measurement components, such as three positioning components, three magnetic sensor components and three inertial measurement components (IMU). The unmanned aerial vehicle can be navigated by a controller using a CAN field bus based on data from the three sets of redundant measurement components. For example, the controller can be configured to select one inertial measurement component, one positioning component and one magnetic sensor component having the best operational status from the plurality to navigate the unmanned aerial vehicle.

In the embodiment shown in FIG. 11, the positioning component can be implemented with a GPS component, and the magnetic sensor component can be implemented with a compass component. The GPS component and the compass component can be integrated in one component.

A viewing request can be generated at a human-machine interaction device if a user wants to check an operation situation of the navigation system. The controller can monitor the operational status of each component of the control system and provide to the human-machine interaction device status indication information of each component, such that the user can intuitively view the operation situation of each component on the human-machine interaction device.

FIG. 11 shows an example of information displayed on the device for providing information.

For instance, the operation situation of each component in the navigation system can include: the GPS/compass component having an index number 1 being in a normal and in use state; the GPS/compass component having an index number 2 being in a fault state; the GPS/compass component having an index number 3 being in a normal but not in use state; the IMU component having an index number 1 being in a normal and in use state; the IMU component having an index number 2 being in a fault state; and the IMU component having an index number 3 being in a normal but not in use state.

The controller can monitor the operational status of each component in the navigation system and send the operational status and the index number of each component to the human-machine interaction interface.

For instance, the controller can generate an indicator display control information from the operational status and the index number of the component based on a preset rule. In some instances, the indicator display control information can include a display color and a flashing frequency of the indicator. The preset rule can include different display colors being used to indicate different operational statuses and different flashing frequencies being used to indicate different index numbers.

For example, the preset rule can comprise red being used to indicate a component in a fault state, green being used to indicate a component in a normal but not in use state, blue being used to indicate a component in a normal and in use state, and the number of flashing being used to indicate an index number. To indicate the operation situation of the control system as described hereinabove, the indicator display control information generated by the device for CAN bus addressing can comprise: a state indicator of the GPS/compass component having an index number 1 displaying blue and flashing once; a state indicator of the GPS/compass component having an index number 2 displaying red and flashing twice; the state indicator of the GPS/compass component having an index number 3 displaying green and flashing three times; the state indicator of the IMU component having an index number 1 displaying blue and flashing once; the state indicator of the IMU component having an index number 2 displaying red and flashing twice; and the state indicator of the IMU component having an index number 3 displaying green and flashing three times.

The device for providing information can control a display color and flashing of the state indicator corresponding to each component based on the received indicator display control information. Referring to the example shown in FIG. 11, a rectangular box under each component can represent an indicator, a color displayed in the rectangular box can represent a displaying color of the indicator (for example, the indicator can emit a light in the displaying color). The black solid circle under each component can represent the number of the indicator flashing to indicate the index number. For example, the indicator under the GPS/compass component at upper left of FIG. 11 can display blue and flash twice, indicating the index number of the GPS/compass component being 2. It will be appreciated that, the embodiment shown in FIG. 11 is merely provided as an example, a color and a shape of the indicator are not limited to the example shown in FIG. 11 and can be determined to meet actual requirements.

With embodiments provided in FIG. 11, the user can learn the operation status of the control system from the information displayed on the device for providing information. The user can distinguish redundant components by virtue of the index number to learn the operation status of a particular component.

It will be appreciated that, in some instances, the device for providing information can be provided with two indicators for each component, one indicator displaying the operational status of the component and the other indicator display the index number of the component. Optionally, the device for providing information can display a text information indicating the operational status and the index number of each component.

The disclosure further provides a hardware configuration of the device for bus addressing and device for providing information as described hereinabove. The hardware configuration can include at least one processor (e.g., CPU), at least one network interface or other communication interface, a memory and at least one communication bus effecting a connection and a communication between devices. The processor can be used to execute an executable component stored in the memory, such as a computer program. The memory can include a random access memory (RAM) and/or a non-volatile memory (e.g., at least one magnetic disk memory). A communication and connection between a system gateway and at least one other network element can be effected using the at least one network interface (e.g., wired or wireless) where Internet, wide area network, local area network, metropolitan area network can be used.

Figure 12:
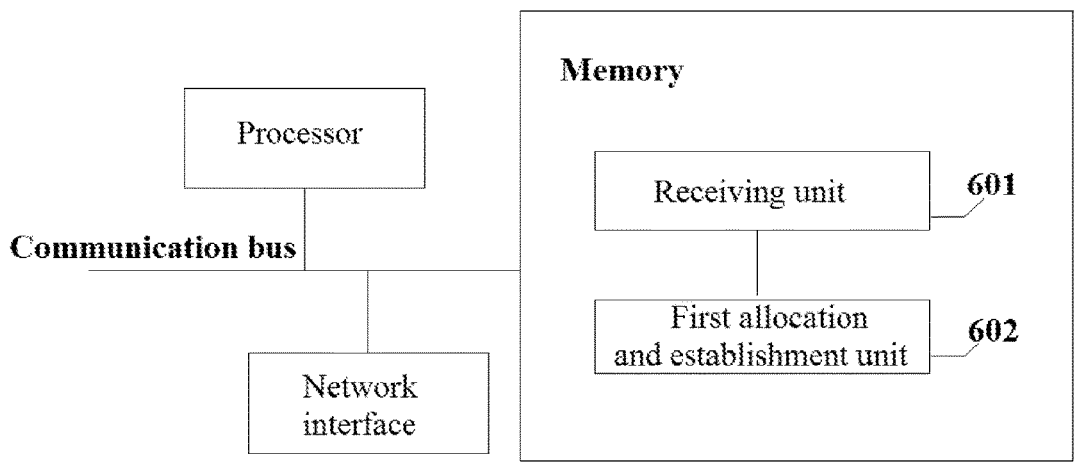
FIG. 12 shows an example of a hardware configuration of a device for bus addressing in accordance with a seventh aspect of the disclosure.

FIG. 12 shows an example of a hardware configuration of a device for bus addressing in accordance with embodiments of the disclosure. In some embodiments, program instructions executable by the processor can be stored in the memory. The program instructions can include a receiving unit 601 and a first allocation and establishment unit 602. A content of the program instructions can be appreciated with reference to FIG. 6 and related description.

Figure 13:
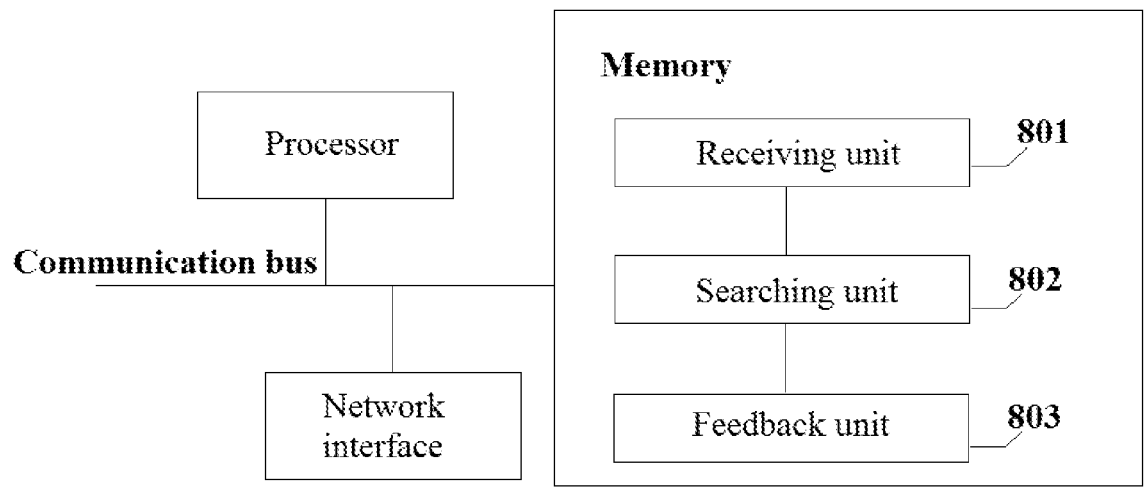
FIG. 13 shows an example of a hardware configuration of a device for providing information in accordance with an eighth aspect of the disclosure.

FIG. 13 shows an example of a hardware configuration of a device for providing information in accordance with embodiments of the disclosure. In some embodiments, program instructions executable by the processor can be stored in the memory. The program instructions can include a receiving unit 801, a searching unit 802 and a feedback unit 803. A content of the program instructions can be appreciated with reference to FIG. 8 and related description.

Figure 14:
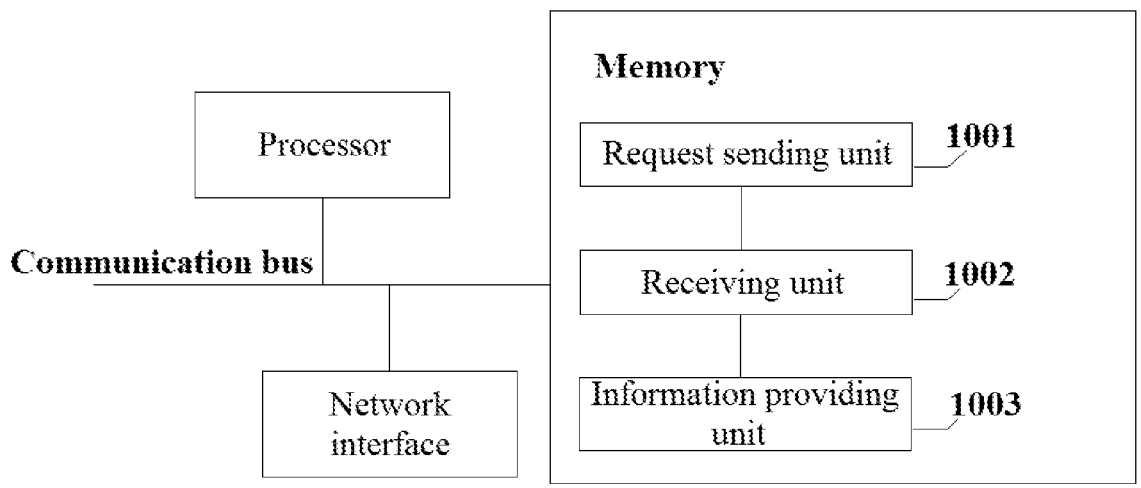
FIG. 14 shows an example of a hardware configuration of a device for providing information in accordance with a ninth aspect of the disclosure.

FIG. 14 shows an example of a hardware configuration of a device for providing information in accordance with another embodiment of the disclosure. In some embodiments, program instructions executable by the processor can be stored in the memory. The program instructions can include a request sending unit 1001, a receiving unit 1002 and an information providing unit 1003. A content of the program instructions can be appreciated with reference to FIG. 10 and related description.

Those skilled in the art will appreciate that, some or all steps of the method as provided in embodiments of the disclosure can be implemented using a software executing on an universal hardware platform. With this understanding, the technical solution of the disclosure may be embodied as a software product. The computer software product can be stored in a storage medium (e.g., ROM/RAM, a diskette, or an optical disk) and includes several instructions for causing a computer device to execute some or all steps of the method according to the various embodiments of the disclosure. The computer device can be a personal computer, a server or a network communication device such as a media gateway.

It will be appreciated that, embodiment as described hereinabove are provided in a progressive manner. The description of respective embodiment may emphasize a difference of the embodiment over others, a reference to other embodiments can be made for those same or similar components. A description of device and system embodiments can be simplified in view of a similarity with method embodiments, and a reference to description of the method embodiments can be made. The device and system embodiments described hereinabove are merely illustrative. The units illustrated as separate parts may or may not be physically separated. The parts shown as units may or may not be physical units. For example, the parts can be provided at the same location or distributed over a plurality of network units. All or part of the components can be selected to implement the embodiments of the disclosure according to actual requirements. Those skilled in the art can appreciate and implement the disclosure without inventive efforts.

The embodiments as described hereinabove are intended to merely illustrate rather than limit the patent scope of the disclosure. Numerous variations, equivalents and improvements made in light of the spirit of the disclosure are within the scope of the disclosure.

What is claimed is:

1. A method for bus addressing comprising:
receiving, by a controller, handshaking information from a component of a control system;
allocating, by the controller through a field bus, a Controller Area Network Identification (CANID) to the component, the CANID being a communication address of the component in a Controller Area Network (CAN) communication bus; and
establishing, by the controller, a correlation between a physical address of the component and the CANID.

2. The method of claim 1, further comprising:
allocating, by the controller through the field bus, an index number to the component; and
establishing, by the controller, a correlation between the physical address, the CANID, and the index number.

3. The method of claim 2,
wherein:
the component is a first component of the control system and the index number is a first index number; and
the control system further includes a second component that is of a same type as the first component;

the method further comprising:
  allocating, by the controller through the field bus, a second index number to the second component, the second index number being different from the first index number.

4. The method of claim 1, wherein:
  the component is a first component of the control system;
  the control system further includes at least one second component; and
  each of the first component and the at least one second component is an inertial measurement component, a positioning component, or a magnetic sensor component;
  the method further comprising, for each second component of the at least one second component:
    allocating, by the controller through the field bus, a unique communication address to the second component;
    establishing, by the controller, a correlation between a physical address of the second component and the unique communication address; and
    providing the unique communication address to the second component to enable the second component to perform a data communication with the controller using the unique communication address.

5. The method of claim 4, further comprising, for each second component of the at least one second component:
  allocating, by the controller through the field bus, a unique index number to the second component; and
  establishing a correlation between the physical address of the second component, the unique communication address of the second component, and the unique index number of the second component.

6. The method of claim 1, further comprising:
  receiving, by the controller, an index number of the component through a configuration interface; and
  establishing, by the controller, a correlation between the physical address, the CANID, and the index number.

7. A device for bus addressing comprising:
  at least one processor;
  at least one of a network interface or another communication interface;
  at least one field bus; and
  a memory storing program instructions that, when executed by the at least one processor, causing the at least one processor to:
    receive handshaking information from a component of a control system;
    allocate a Controller Area Network Identification (CANID) to the component through the field bus, the CANID being a communication address of the component in a Controller Area Network (CAN) communication bus; and
    establish a correlation between a physical address of the component and the CANID.

8. The device of claim 7, wherein the instructions further cause the at least one processor to:
  allocate an index number to the component; and
  establish a correlation between the physical address, the CANID, and the index number.

9. The device of claim 8, wherein:
  the component is a first component of the control system and the index number is a first index number;
  the control system further includes a second component that is of a same type as the first component;
  the instructions further cause the at least one processor to:
    allocate a second index number to the second component, the second index number being different from the first index number.

10. The device of claim 7, wherein:
  the component is a first inertial measurement component of the control system;
  the control system further includes at least one second inertial measurement component;
  each one of the at least one second inertial measurement component having a unique physical address; and
  wherein the instructions further cause the at least one processor to, for each second inertial measurement component of the at least one second inertial measurement component:
    allocate a unique communication address to the second inertial measurement component through the field bus;
    establish a correlation between the unique physical address of the second inertial measurement component and the unique communication address of the second inertial measurement component; and
    providing the unique communication address to the second inertial measurement component to enable the second inertial measurement component to perform a data communication with a controller using the unique communication address.

11. The device of claim 10, wherein the instructions further cause the at least one processor to, for each second inertial measurement component of the at least one second inertial measurement component:
  allocate a unique index number to the second inertial measurement component through the field bus; and
  establish a correlation between the unique physical address of the second inertial measurement component, the unique communication address of the second inertial measurement component, and the unique index number of the second inertial measurement component.

12. The device of claim 7, wherein:
  the component is a first positioning component of the control system;
  the control system further includes at least one second positioning component;
  each one of the at least one second positioning component having a unique physical address; and
  wherein the instructions further cause the at least one processor to, for each second positioning component of the at least one second positioning component:
    allocate a unique communication address to the second positioning component through the field bus;
    establish a correlation between the unique physical address of the second positioning component and the unique communication address of the second positioning component; and
    providing the unique communication address to the second positioning component to enable the second positioning component to perform a data communication with a controller using the unique communication address.

13. The device of claim 12, wherein the instructions further cause the at least one processor to, for each second positioning component of the at least one second positioning component:
  allocate a unique index number to the second positioning component through the field bus; and
  establish a correlation between the unique physical address of the second positioning component, the unique communication address of the second positioning component, and the unique index number of the second positioning component.

14. The device of claim 7, wherein:
the component is a first magnetic sensor component of the control system;
the control system further includes at least one second magnetic sensor component;
each one of the at least one second magnetic sensor component having a unique physical address; and
wherein the instructions further cause the at least one processor to, for each second magnetic sensor component of the at least one second magnetic sensor component:
    allocate a unique communication address to the second magnetic sensor component through the field bus;
    establish a correlation between the unique physical address of the second magnetic sensor component and the unique communication address of the second magnetic sensor component; and
    providing the unique communication address to the second magnetic sensor component to enable the second magnetic sensor component to perform a data communication with a controller using the unique communication address.

15. The device of claim 14, wherein the instructions further cause the at least one processor to, for each second magnetic sensor component of the at least one second magnetic sensor component:
    allocate a unique index number to the second magnetic sensor component through the field bus; and
    establish a correlation between the unique physical address of the second magnetic sensor component, the unique communication address of the second magnetic sensor component, and the unique index number of the second magnetic sensor component.

16. The device of claim 7, wherein the instructions further cause the at least one processor to:
    receive an index number of the component through a configuration interface; and
    establish a correlation between the physical address, the CANID, and the index number.

\* \* \* \* \*